United States Patent
Velasco

[19]

[11] Patent Number: 5,988,043
[45] Date of Patent: Nov. 23, 1999

[54] MODULATOR ADJUSTMENT DEVICE

[76] Inventor: Robert Velasco, 734 Berryessa Rd., San Jose, Calif. 95112

[21] Appl. No.: 07/623,711
[22] PCT Filed: Apr. 10, 1990
[86] PCT No.: PCT/US90/01940
§ 371 Date: Feb. 11, 1992
§ 102(e) Date: Feb. 11, 1992
[87] PCT Pub. No.: WO90/12198
PCT Pub. Date: Oct. 18, 1990

Related U.S. Application Data

[63] Continuation-in-part of application No. 07/335,714, Apr. 10, 1989, abandoned.

[51] Int. Cl.$^6$ .................................................. F01B 31/00
[52] U.S. Cl. .......................... 92/133; 92/130 R; 92/145; 74/DIG. 1; 477/156
[58] Field of Search ............................. 92/98 R, 99, 96, 92/130 A, 130 R, 133, 145, 128; 74/363, 366, 367, DIG. 1; 477/156

[56]           References Cited
U.S. PATENT DOCUMENTS 3,377,922   4/1968   Spender ............................... 92/130 R
3,397,621   8/1968   Groves ................................. 92/130 R
3,410,159  11/1968   Zundel .................................. 477/156
3,566,718   3/1971   Wrightman ........................... 477/156
3,724,294   4/1973   Gaus ..................................... 477/156

Primary Examiner—Thomas E. Denion

[57]            ABSTRACT

A modulator adjustment device (10) including a generally cylindrical body (36, 37) having cavities formed at opposite ends thereof and a dial wheel (32) extending radially outwardly and circumscribing the body, a rotatable coupling (48) disposed in the cavity at one end of the body for sealingly engaging the vacuum fitting (20) of a modulator or the like, and a tube fitting (38) rotatably disposed within the cavity (35) at the other end of the body and having a distal end to which a vacuum tube (12) may be coupled. Suitable means are provided along the axis of the body for drivably engaging the adjustment screw (22) of the modulator. In one embodiment, such means includes an appropriately configured opening (20) for receiving and mating with the drive screw (22), and in a second embodiment the means includes a spring loaded screwdriver device (84) for drivably engaging a slot or socket in the end of the adjustment screw.

15 Claims, 3 Drawing Sheets

MODULATOR ADJUSTMENT DEVICE

This application is a continuation-in-part of U.S. application Ser. No. 07/335,714 filed Apr. 10, 1989, and claims priority from that application and PCT Application No. U.S. 90/01940 with a PCT filing date of Apr. 10, 1990.

BACKGROUND OF THE INVENTION

1. Field of the Invention

The present invention relates generally to adjustment devices for fluid control apparatus, and more particularly to a means for permitting the adjustment of a vacuum modulator spring load control shaft or screw by means other than an external tool such as a screwdriver or wrench, and without removing the continuous fluid or vacuum line to make the adjustment.

The invention has particular application to an automobile transmission vacuum modulator to make adjustments easier and more accurate.

This application is a continuation-in-part of my co-pending application entitled "Modulator Adjustment Device", Ser. No. 07/335,714, filed Apr. 10, 1989, and is related to my co-pending application entitled "Apparatus for Remotely Adjusting Transmission Vacuum Modulators", Ser. No. 498,719, filed Mar. 26, 1990, both of which are incorporated herein by reference.

2. Description of the Prior Art

The original vacuum modulator on automobile transmissions were not adjustable and merely included a vacuum line connected to a tube fitting on the transmission's vacuum modulator. As the engine speeded up and engine manifold vacuum increased with the engine's acceleration, the vacuum pulled on the diaphragm inside the modulator, and the diaphragm moved proportionately. The diaphragm was used to move a rod in and out of the transmission causing gear shifting to take place. The tension on the diaphragm and thus the amount of vacuum required to move the diaphragm enough to cause shifting could not be adjusted.

The more recent generation of vacuum modulators have a screw in the tube fitting and include some type of airway to allow air to flow through a passageway extending along the length of the screw. The purpose of the screw is to adjust the tension of a spring biased against the diaphragm in the modulator. When the screw is turned to increase the pressure of the spring against the diaphragm, a higher vacuum is required to cause shifting, and thus the transmission will be shifted at a higher speed.

The adjustment of the screw is achieved by removing the vacuum line, inserting a tool into the tube fitting to turn the screw, and then reconnecting the vacuum line. This is a difficult and time-consuming "cut and try" process, since the screw cannot be seen inside the tube fitting, thus accurate adjustments cannot be easily made. Any service technician would prefer to have a device in the line to the modulator to adjust the screw, rather than using a tool to make the adjustments.

SUMMARY OF THE PRESENT INVENTION

Accordingly, a principle object of the present invention is to provide a device for enabling easy, reliable and accurate adjustment of a modulator screw or shaft without removing the air, vacuum and/or other fluid control line from the modulator or any other similar device.

Another object of the present invention is to provide a device of the type described that will cause a shaft to be rotated inside a housing while allowing tubes, lines or other apparatus connected to the ends of the device to remain stationary relative to the rotating screw or shaft.

Briefly, a presently preferred embodiment of the present invention includes a generally cylindrical body having cavities formed at opposite ends thereof and a dial wheel extending radially outwardly and circumscribing the body, a rotatable coupling disposed in the cavity at one end of the body for sealingly engaging the vacuum fitting of a modulator or the like, and a tube fitting rotatably disposed within the cavity at the other end of the body and having a distal end to which a vacuum tube may be coupled. Suitable means are provided along the axis of the body for drivably engaging the adjustment screw of the modulator. In one embodiment, such means includes an appropriately configured opening for receiving and mating with the drive screw, and in a second embodiment the means includes a spring loaded screwdriver device for drivably engaging a slot or socket in the end of the adjustment screw.

An important advantage of the present invention is that it provides a means which can be retrofit onto a vacuum modulator at the point that the vacuum tube is normally attached, and serves as a coupling between tube and modulator, at the same time allowing adjustment of the modulator with the actuating vacuum source attached.

Another object of the present invention is that it provides a means which allows the shift points of an automobile transmission to be adjusted under operational conditions.

These and other objects and advantages of the present invention will no doubt become apparent to those skilled in the art after having read the following detailed description of the preferred embodiments depicted in the several figures of the drawing.

IN THE DRAWING

DETAILED DESCRIPTION OF THE PREFERRED EMBODIMENTS

Figure 1:
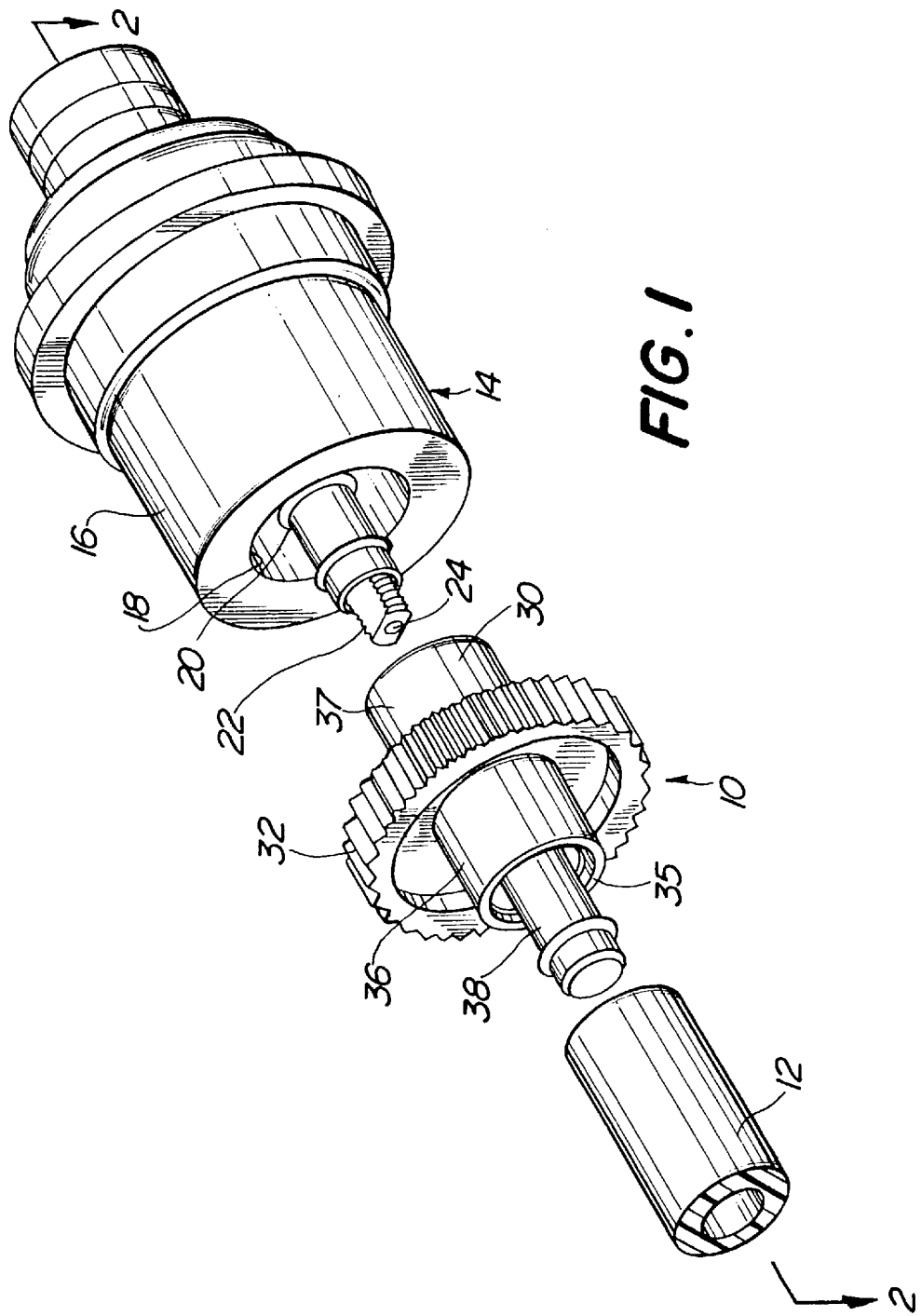
FIG. 1 is an exploded perspective view illustrating a preferred embodiment of the present invention disposed between a vacuum line and a modulator to be adjusted.

Referring now to FIG. 1 of the drawing, a modulator adjustment device in accordance with the present invention is shown at 10, disposed between a vacuum supply line 12 and a vacuum modulator 14. Modulator 14, as depicted, includes an outer housing 16 having an annular recess 18 formed in one end thereof and circumscribing a tube fitting 20, which serves as a vacuum inlet to which tube 12 is normally attached. The internal bore of fitting 20 is threaded for engagement with an adjustment screw 22 which is used to adjust the diaphragm load spring (not shown) of modulator 14. Screw 22 is provided with an axial opening 24 which allows vacuum to be communicated therethrough when tube 12 is coupled to fitting 20. It will be apparent that prior to installation of the present invention vacuum tube 12 would have to be removed from fitting 20 in order to turn screw 22 using an appropriate tool.

As depicted, the illustrated embodiment 10 of the present invention includes a generally cylindrical outer housing or body 30 having a dial wheel 32 circumscribing body 30 and formed integral therewith. As will be further described below, housing 30 includes a slot for engaging screw 22 and cavities formed in each end for accommodating means for sealingly engaging tube 12 and fitting 20 but permitting rotation of body 30 relative thereto.

Inserted into cavity 35 in the front portion 36 of housing 30 is a rotatable tube fitting 38, the distal end of which is adapted to receive tube 12. The opposite end portion 37 is likewise provided with a cavity (not shown) for housing a means suitably adapted to sealingly engage tube 20 but allow rotation of body 30 relative thereto.

Device 10 is installed by simply removing vacuum tube 12 from fitting 20, pressing the rear end portion of housing 30 over fitting 20 and then slipping tube 12 over the end fitting 38.

Figure 2:
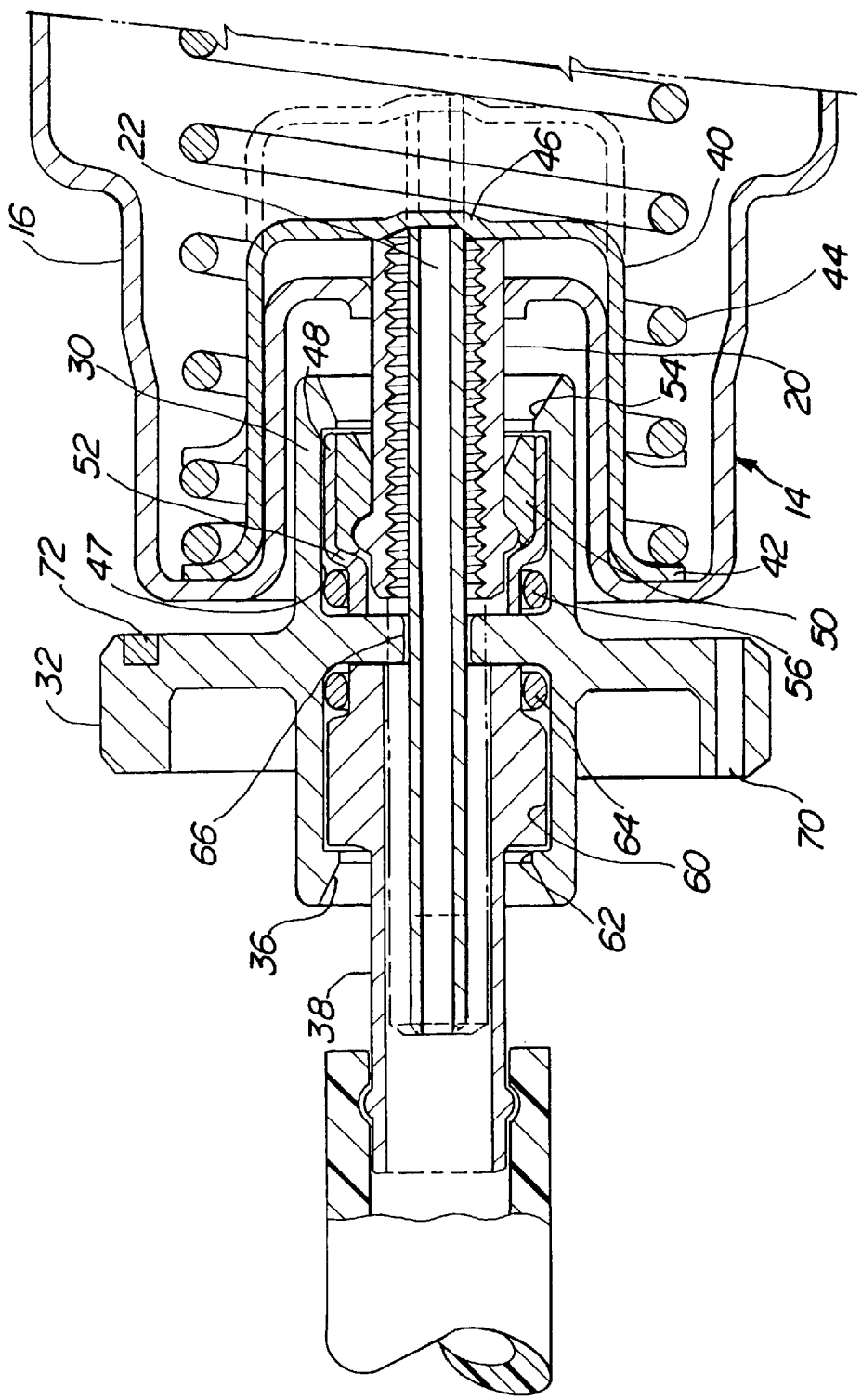
FIG. 2 is an axial cross-section taken along the line 2—2 of FIG. 1.

In FIG. 2, which is a partial longitudinal cross-section taken along the line 2—2 of FIG. 1, the various component parts of the apparatus shown in FIG. 1 are revealed in more detail. Disposed within the housing 16 of modulator 14 is a retainer cup 40 having one end flared to form a bearing surface 42 for one end of the diaphragm load spring 44. The opposite end of cup 40 is adapted as indicated at 46 to be engaged by screw 22, such that, when screw 22 is rotated in one direction within the threaded fitting 20, it drives cup 40 rightwardly increasing the compression of spring 44, and when turned in the opposite direction, it reduces the compression of spring 44.

As was suggested above, the cavity 47 formed in the end of housing 30 of the present invention houses a means 48 for sealingly engaging fitting 20 while at the same time allowing housing 30 to be rotated relative thereto. More specifically, means 48 includes a resilient retainer ring 50 disposed within a coupling sleeve 52 which is snap-fit into the cylindrical cavity 47 past retaining tabs 54. Sealing between sleeve 52 and housing 30 is accomplished by means of an O-ring 56. At the opposite end 36 of housing 30, a similar cavity 60 is formed for receiving the tube fitting insert 38 which is likewise snap-fit into cavity 60 past retainer tabs 62 and sealingly engaged to housing 30 by means of an O-ring 64.

Figure 3:
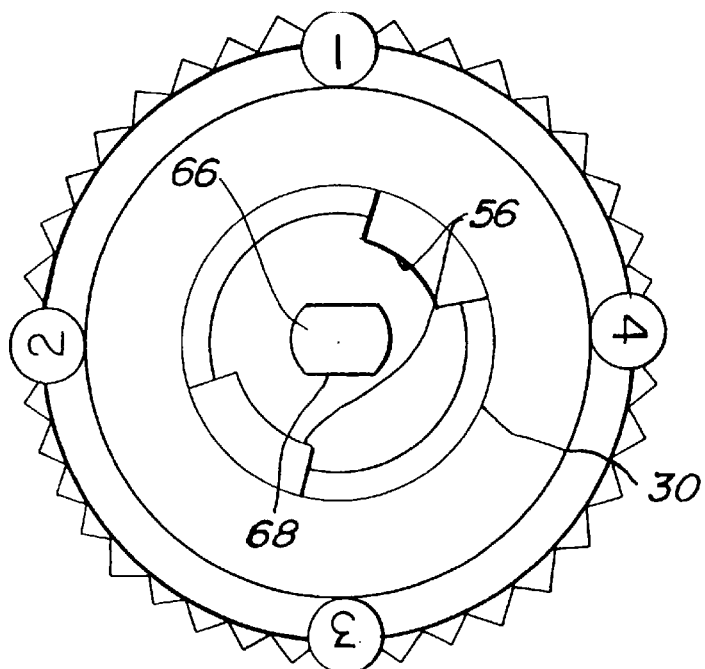
FIG. 3 is a rear end elevation of the present invention depicted in FIG. 1.

As is more clearly shown in the end elevational view of FIG. 3, housing 30 includes a slot 66 for receiving screw 22. Slot 66 has flat sides 68 for engaging the flats of screw 22. It will of course be appreciated that slot 66 could have any configuration suitable for matingly engaging screw 22.

The external periphery of housing 30 is provided with gear teeth, knurling, or other suitable surfacing, for facilitating turning thereof relative to modulator 14. Positioned at appropriate points around the perimeter of dial wheel 32 are appropriate detectable indicia which enable the rotary position of the dial wheel to be determined. For example, for certain applications mere legible numbers may be appropriate. In other cases, where the devices to be used in association with a remote control mechanism such as is disclosed in my above mentioned co-pending U.S. patent application Ser. No. 07/498,719 optically detectable holes 70 or small magnets 72, or other means may be included as suggested in FIG. 2.

Figure 4:
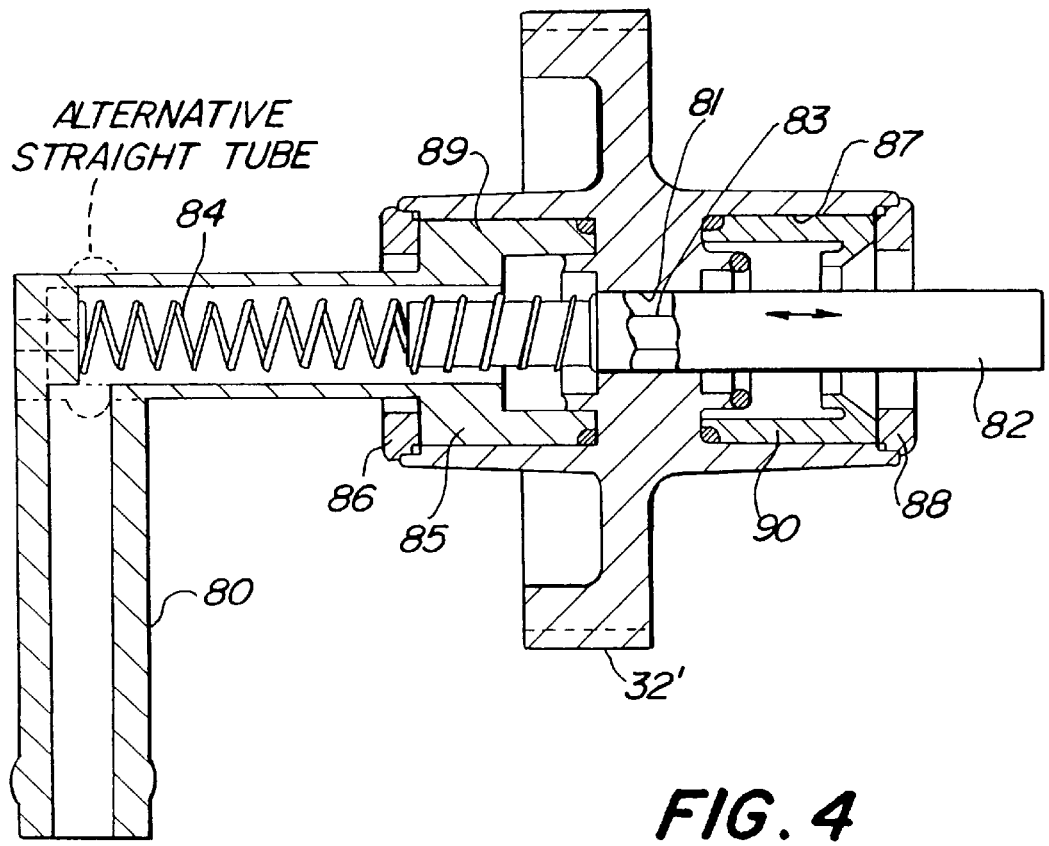
FIG. 4 is an axial cross-section taken through an alternative embodiment of the present invention.

Turning now to FIG. 4 of the drawing, an alternative embodiment is depicted which differs from the first embodiment primarily in that the vacuum tube fitting 80 is turned 90 degrees to the axis of the device, and further in that, instead of including an aperture for receiving an adjustment screw, the aperture 81 is a narrow slot adapted to slidably receive a spring (84) loaded screwdriver means is provided for engaging and driving an adjustment screw having a slotted screw head. In addition, the central portion of slot 81 is bored as shown at 83 to provide a passage between end cavities 85 and 87. Another minor difference between this embodiment and the previously described embodiment is that retainer caps 86 and 88 respectively hold the base portion 89 of tube fitting 80 and fitting engagement sleeve 90 in place. This particular embodiment is adapted for use with those modulator devices in which the adjustment screw is disposed within the threaded internal passage of the vacuum tube fitting and is provided with a slotted end surface to be engaged by a screwdriver.

In operation, one need merely select the appropriate embodiment of the present invention to suit a particular type of modulator, remove the vacuum hose from the modulator vacuum tube fitting, attach the adjustment mechanism to the fitting, and then attach the vacuum hose to the new tube fitting. Adjustment of the modulator can then be effected by merely rotating the dial wheel 32 in the appropriate direction.

In addition, one may use a remote control adaptor of the type described in the second above mentioned co-pending application in order to remotely turn dial wheel 32.

Although the present invention has been described above in terms of two presently preferred embodiments, it is understood that additional alterations and modifications will no doubt become apparent to those skilled in the art after having read the above disclosure. It is therefore intended that the following claims be interpreted as covering all such alterations and modifications as fall within the true spirit and scope of the invention.

What is claimed is:

1. An adjustment device for vacuum modulators including a spring loaded diaphragm having an adjustment screw extending through a input fitting to which a vacuum tube is coupled, comprising:

an elongated outer housing rotatable about an axis and having means forming a communicative passageway between a first end and a second end;

first means disposed proximate said first end and along said axis for sealingly engaging the vacuum input fitting of the modulator;

second means disposed proximate said second end and to which the vacuum tube is connected;

and means for drivably engaging the adjustment screw of the modulator, said housing being rotatable relative to said first and second means.

2. An adjustment device as recited in claim 1 wherein said housing further includes a dial wheel extending radially outwardly therefrom and circumscribing said housing.

3. An adjustment device as recited in claim 2 wherein the outer perimeter of said dial wheel has a toothed configuration suitable for engagement by a gear wheel.

4. An adjustment device as recited in claim 1 wherein said first end includes a first cavity and said first means includes an annular insert having a first portion for engaging the vacuum inlet fitting of the modulator and a second portion adapted to be disposed within and to sealingly engage said first cavity.

5. An adjustment device as recited in claim 4 wherein said second portion is provided with an O-ring for sealingly engaging an interior surface of said first cavity.

6. An adjustment device as recited in claim 5 wherein said housing has a second cavity formed in said second end, and wherein said second means includes an annular base portion adapted to be received within said second cavity and having means for sealingly engaging an interior surface of said second cavity.

7. An adjustment device as recited in claim 6 wherein said annular base portion includes an O-ring for sealingly engaging the walls forming said second cavity.

8. An adjustment device as recited in claim 1 wherein said means for engaging the adjustment screw of the modulator is an opening formed along the axis of said housing for receiving one end and drivably engaging said screw.

9. An adjustment device as recited in claim 1 wherein said means for drivably engaging said screw is a spring loaded screwdriver having a loading spring affixed to one end and a screw coupling head configured at the other end, said screwdriver being axially movable relative to said housing but restrained from rotation relative thereto such that rotation of said housing causes rotation of a screw engaged by said screwdriver.

10. An adjustment device as recited in claim 7 wherein said housing further includes a dial wheel extending radially outwardly therefrom and circumscribing said housing.

11. An adjustment device as recited in claim 8 wherein said housing further includes a dial wheel extending radially outwardly therefrom and circumscribing said housing.

12. An adjustment device as recited in claim 9 wherein said housing further includes a dial wheel extending radially outwardly therefrom and circumscribing said housing.

13. An adjustment device as recited in claim 7 wherein said means for engaging the adjustment screw of the modulator is an opening formed along the axis of said housing for receiving one end and drivably engaging said screw.

14. An adjustment device as recited in claim 7 wherein said means for drivably engaging said screw is a spring loaded screwdriver having a loading spring affixed to one end and a screw coupling head configured at the other end, said screwdriver being axially movable relative to said housing but restrained from rotation relative thereto such that rotation of said housing causes rotation of a screw engaged by said screwdriver.

15. An adjustment device as recited in claim 2 wherein said dial wheel includes detectable indicia of rotary position.

* * * * *